United States Patent [19]

Giberson et al.

[11] Patent Number: 5,144,862
[45] Date of Patent: Sep. 8, 1992

[54] ROTATING SHAFT MOUNTED ACTUATING MECHANISM

[76] Inventors: Melbourne F. Giberson, 5 Spring Mill La., Haverford, Pa. 19041; Richard P. Lindgren, P.O. Box 492, Chester Springs, Pa. 19425

[21] Appl. No.: 585,722

[22] Filed: Sep. 19, 1990

[51] Int. Cl.⁵ .............................. F16F 15/22
[52] U.S. Cl. .................................. 74/573 R
[58] Field of Search ................. 74/573 R, 574

[56] References Cited

U.S. PATENT DOCUMENTS

| | | | |
|---|---|---|---|
| 4,117,742 | 10/1978 | Stein | 74/573 R |
| 4,474,076 | 10/1984 | Lehmann | 74/573 R |
| 4,867,006 | 9/1989 | Giberson et al. | 74/573 R |
| 5,007,305 | 4/1991 | Linder | 74/573 R |

*Primary Examiner*—Dirk Wright
*Attorney, Agent, or Firm*—Polster, Lieder, Woodruff & Lucchesi

[57] ABSTRACT

An actuating mechanism installed intermediate the ends of a shaft without access to an end of the shaft is operative to perform a function requiring motion while the shaft is rotating. It includes a split hub mounted on and around the shaft, a pinion mounted to be rotated about an axis, a drive train operated by the pinion, and a brake adapted to cause the pinion to rotate selectively in one direction or the other.

8 Claims, 2 Drawing Sheets

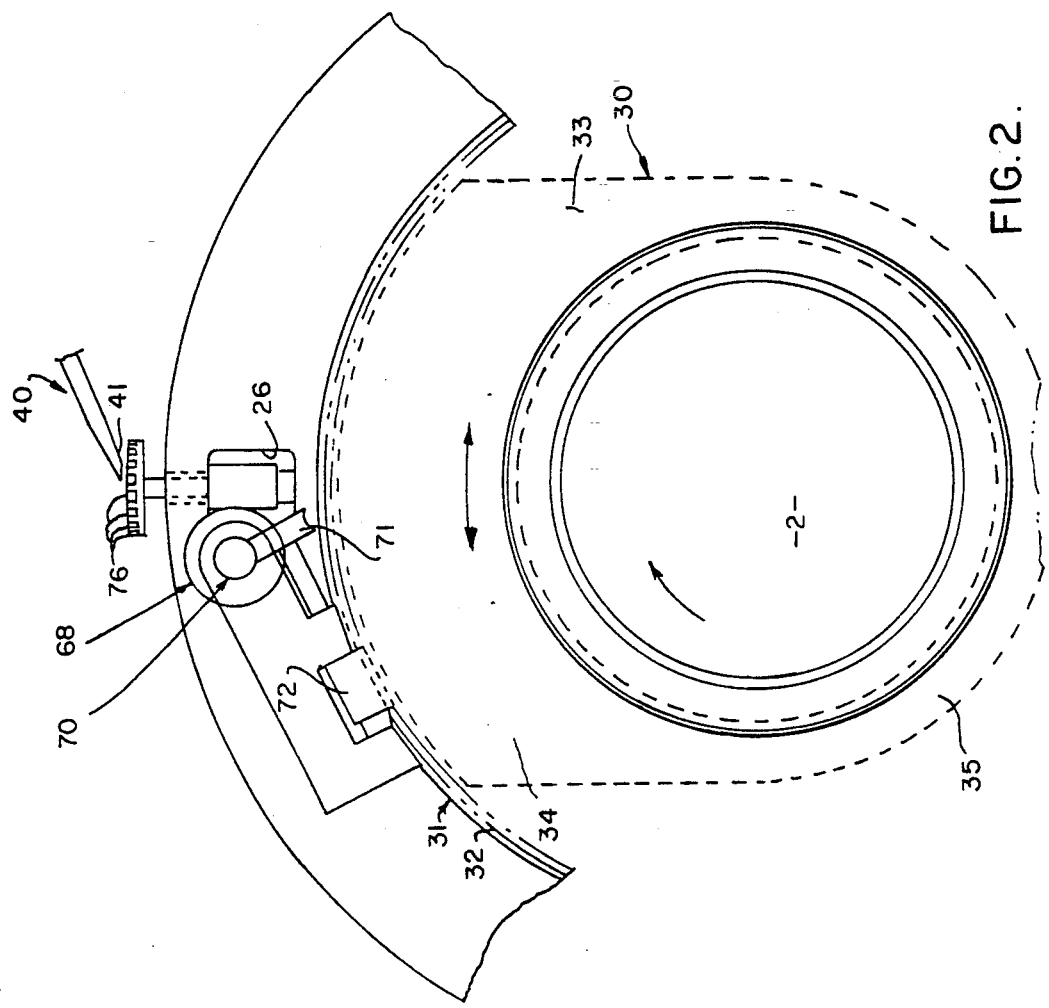
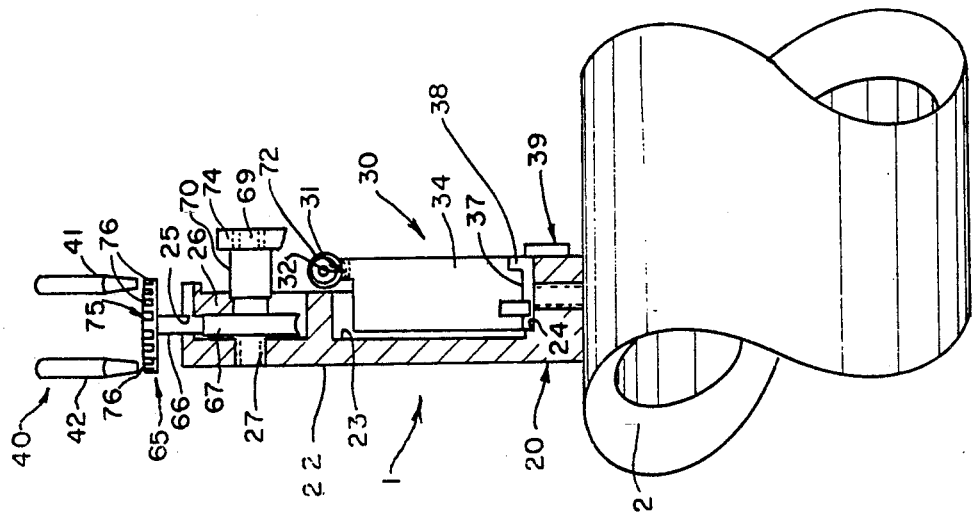
FIG. 2.
FIG. 1.

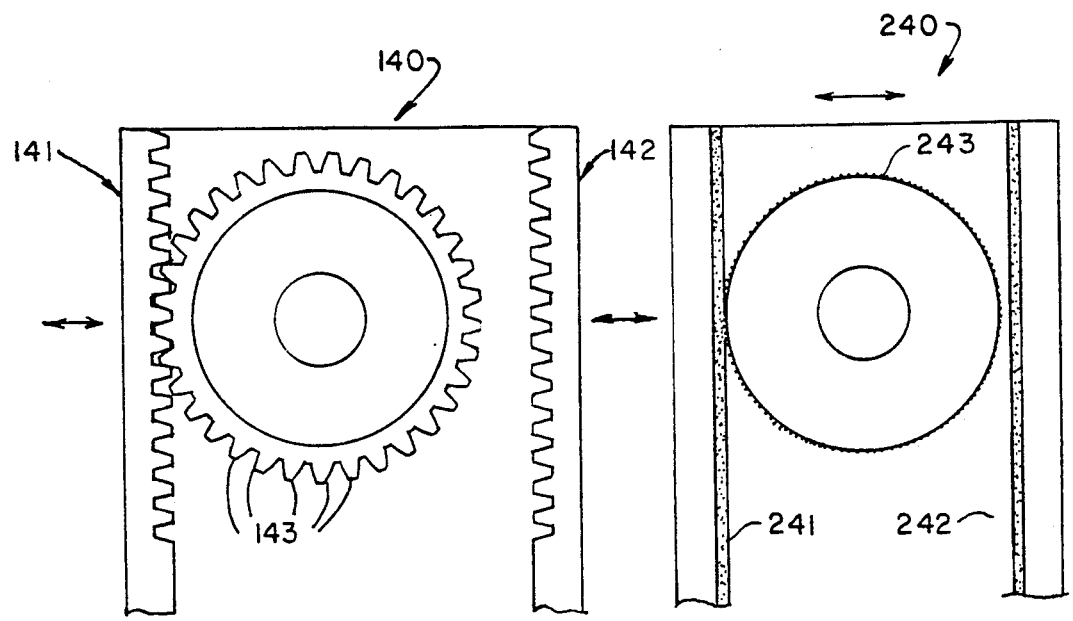
FIG. 3.                      FIG.4.
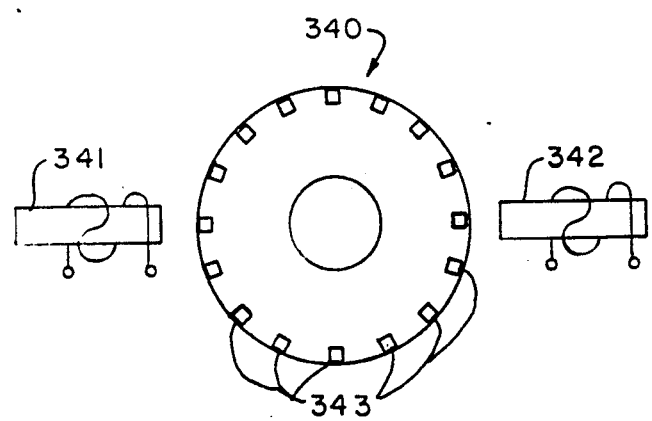
FIG.5.

ROTATING SHAFT MOUNTED ACTUATING MECHANISM

BACKGROUND OF THE INVENTION

This invention has to do with a modification of the mechanism illustrated and described in our U.S. Pat. No. 4,867,006 issued Sep. 19, 1989, the description of which is incorporated herein by reference.

In the mechanism of that patent, a pinion, connected by a power train to an actuator, is rotated selectively in one direction or another by ring gears positioned on either side of the pinion. A brake mechanism is selectively actuable to slow down one of the ring gears with respect to the other of the ring gears, thereby causing the pinion to rotate. This is an excellent arrangement. However, it has been found that there are applications in which the use of the ring gears is not necessary to accomplish the rotation of the pinion.

One of the objects of this invention is to provide a device of the character of the mechanism shown and described in U.S. Pat. No. 4,867,006, in which the ring gears are eliminated and other pinion-rotating means provided.

Other objects of this invention will be apparent to those skilled in the art in light of the following description and accompanying drawings.

SUMMARY OF THE INVENTION

In accordance with this invention, generally stated, actuating mechanism is provided that is adapted to be installed intermediate the ends of a shaft and to operate to perform a function requiring motion while the shaft is rotating. It includes a split hub mounted on and around the shaft intermediate the ends thereof. The hub supports a pinion, a power train, operatively connected to the pinion and an actuator connected to the pinion by the power train. The actuator is adapted to move in either of two directions, depending upon the direction of rotation of the pinion. A brake mechanism fixed against rotation with the shaft, is applied directly to a radial projection of the pinion to rotate the pinion by a small increment each time the pinion passes the brake mechanism.

BRIEF DESCRIPTION OF THE DRAWINGS

In the drawings, FIG. 1 is a somewhat diagrammatic view, partly broken away and partly in section, of one embodiment of mechanism of this invention, the view corresponding to FIG. 9 of U.S. Pat. No. 4,867,006;

FIG. 2 is a fragmentary, somewhat diagrammatic view, partly broken away and partly in section, perpendicular to the view shown in FIG. 1;

FIG. 3 is a somewhat diagrammatic top plan view of another embodiment;

FIG. 4 is a somewhat diagrammatic top plan view of yet another embodiment; and

FIG. 5 is a somewhat diagrammatic top plan view of still another embodiment.

DESCRIPTION OF THE PREFERRED EMBODIMENT

Referring now to FIGS. 1 and 2, reference numeral 1 indicates an actuating mechanism of this invention, mounted on a shaft 2 which, like the shafting 2 of U.S. Pat. No. 4,867,006, can be part of a turbine driven generator system, for purposes of illustration. In fact, except for the mechanism by which a pinion is rotated selectively, the embodiment illustrated in FIGS 1 and 2 is a counterpart of the arrangement shown in FIGS 9 and 8 of U.S. Pat. No. 4,867,006.

In the present device, a split hub 20 is provided, pinned to the shaft to rotate with the shaft. The hub 20 has a radially extending plate section 22, with a counter-weight channel 23. The radially inboard wall of the counter-weight channel has in it a step 24. Radially outboard of the counter-weight channel, the plate 22 has a pinion shaft journal 25, a worm gear cavity 26, and a worm gear shaft journal 27. A counter-weight assembly 30 which, like the hub, is split diametrically and its tow parts connected by dowel pins and threaded studs, includes a worm gear 31, circular in elevation, with teeth 32, and, integral with the worm gear 31, a counter-weight 33. The counter-weight 33 has, in its assembled condition, a uniformly circular cylindrical inside surface, stepped at its laterally outside edge to receive a flange 38 of a bronze bearing ring 37 seated in the step 24 and retained by a retaining ring 39. As has been indicated, the worm gear portion 31 of the counter-weight has a uniform outside diameter. Accordingly, to provide a counter-balance mechanism the part of the counter-weight 33 shown in FIG. 1 and indicated in dotted lines in FIG. 2, has a heavy section 34 extending radially to a place close to the teeth 32 of the worm gear 31, and a relatively light section 35 extending radially outwardly only a relatively short distance in the direction of the teeth 32.

A pinion 65 has a pinion shaft 66 which carries a pinion worm 67. The pinion worm 67 engages a pinion worm gear 68, secured to a worm gear shaft 69, which in turn, carries a counter-weight worm 70. The counter-weight worm 70 engages a counter-weight worm gear 71 that drives a worm 72 that meshes with the teeth 32 of the counter-weight 33.

The pinion 65 and all of the drive train between the pinion and the gear 32 are mounted in and on the hub plate 22, part of it being supported by a bearing block 74 mounted on a radial surface of the hub plate. The pinion and drive train are therefore fixed with respect to the hub and the shaft, and serve to rotate the counter-weight mechanism relative to the shaft.

As is explained in U.S. Pat. No. 4,867,006, a plurality of sets of counter-balance mechanisms can be provided, in any desired number.

In this embodiment, the pinion 65 is provided with a radially extending head 75 in the form of a disc concentric with the shaft 66. The upper side of the head 75 is provided with a multiplicity of vanes or pockets 76, arranged symmetrically circumferentially around the upper surface of the head, which form part of a braking system 40.

In this embodiment, the braking system 40 includes pneumatic nozzles 41 and 42, both lying in a plan at an acute angle to the plane of the head 75, but equi-spaced on diametrically opposite sides of the axis of the shaft 66. The nozzles 41 and 42 are fixed against rotation, so that the pinion passes under them once upon each revolution of the shaft 2.

It can be seen that if gas under pressure is expelled through the nozzle 41, and not through the nozzle 42, assuming that the shaft is rotating clockwise as viewed in FIG. 2, the pinion 65 will be rotated a short distance clockwise, as viewed from the top down, each time it passes the nozzle 41, by virtue of the impingement of the gas on the pockets contiguous the nozzle as they pass. If the nozzle 41 is closed and the nozzle 42 is used to direct a stream of gas under pressure, the pinion 65 will be rotated in a counter clockwise direction through a small but predetermined increment each time it passes the nozzle 42. As is explained in detail in U.S. Pat. No. 4,867,006, the rotation of the pinion 65 will move the counter-weight with respect to the shaft 2, to counter imbalance in the shaft or machinery to which the shaft is connected. Of course, the mechanism will be used only when there is an imbalance to be corrected.

Although the nozzles 41 and 42 are described as pneumatic nozzles, it will be seen that liquid under pressure can be used as the moving medium, as well as compressed air, other compressed gas, or steam.

Referring now to FIG. 3, a mechanism is shown somewhat diagrammatically, in which a braking system 140 includes a shiftable yoke, carrying two rack segments 141 and 142, on opposite sides of the pinion head 75. The pinion head 75 in this embodiment is provided with gear teeth 143 complementary to the gear teeth of the racks 141 and 142. In this embodiment, when the rack 141 is in position to permit its teeth to engage teeth 143 of the pinion 65, the teeth of the rack 142 will be clear of the teeth 143. As the pinion 65 passes the rack 141, the engagement of teeth 143 and the teeth of the rack 141 will cause the pinion to be rotated a short distance in one direction, and the engagement of the teeth of the rack 142, when the rack 141 is moved out of the way, will cause the pinion to rotate a short distance in the opposite direction. Normally, of course, neither rock will engage the pinion, because the shaft will be balanced.

In the embodiment shown in FIG. 4, the pinion head 75 is provided with a knurled or roughened peripheral surface, and surfaces 241 and 242 of a brake system 240 on a shiftable yoke, are such as frictionally to engage the roughened surface 243, causing the pinion 65 to rotate through a small degree of arc, as the pinion passes the surface.

Referring now to FIG. 5, a brake system 340 includes a pair of oppositely disposed electro magnets 341 and 342. The head 75 of the pinion 65 is provided with magnetically attractable or repellable segments, either in the form of small permanent magnets oriented so that all of the poles facing the perimeter are the same, or of soft iron, set in a head 75 of non-magnetic material, or, if the head is made of magnetic material, it can be cut out to form teeth. The electro-magnets 341 and 342 can be energized at the critical moment of passing, to prevent dithering.

Numerous variations in the construction of the mechanism of this invention will become apparent to those skilled in the art in the light of the foregoing disclosure. Merely by way of example, the head 75 can take the form of radially extending spokes, either carrying the pockets of the embodiment shown in FIGS. 1 and 2 or the magnetic material of the embodiment shown in FIG. 5. They can also be engaged by a finger or rod carried by a yoke or otherwise carried to move into and out of spoke-engaging position. In any of the embodiments described as being in the form of a yoke, the elements described carried by the yoke can be independently mounted and independently moved toward and away from the pinions. The amount of rotation produced in one pass of the pinion in the embodiments shown in FIGS. 3 and 4 depends upon the length of the rack, which can be in the form of a segment of a ring gear, or the length of the frictional surface. However, it is generally desirable to rotate the pinion through only a small arc at each pass. The head 75 can be formed as a cylinder of substantial axial extent, and the braking action can take the form of eddy currents, the electromagnetic poles being energized periodically to avoid the problem of dithering. The provision of a plurality of worms and worm gears, as illustrated, provides an excellent means for blocking rotation of the pinion about its shaft axis in response to the rotation of the shaft, and is the preferred arrangement. However, other means for insulating the pinion 65 from the forces tending to cause unwanted rotation of the pinion can be devised. The mechanism that is moved by the rotation of the pinion can, as is indicated in the various embodiments illustrated and described in U.S. Pat. No. 4,867,006, be varied widely, and other mechanism besides counter-balance mechanism can be operated by the rotation of the pinion. These are merely illustrative.

Having thus described the invention, what is claimed and desired to be secured by Letters Patent is:

1. An actuating mechanism installed intermediate the ends of a shaft and operative to perform a function requiring motion while the shaft is rotating, comprising a split hub mounted on and around said shaft intermediate the ends thereof, actuating means carried by said hub, and drive means operatively connected to said actuating means for selectively moving said actuating means with respect to said shaft, said drive means comprising pinion means mounted for rotation about an axis, a power train operatively connecting said pinion means to said actuating means to move said actuating means in either of two directions, depending upon the direction of rotation of said pinion, means for preventing rotation of said pinion means by said power train, and pinion rotating means, fixed with respect to said machine against rotation with said actuating means, for selectively rotating said pinion about its axis through a predetermined arc upon each revolution of said shaft when said pinion rotating means is actuated.

2. The actuating mechanism of claim 1 wherein said pinion means has means extending radially from said pinion means axis, and means carried by said radially extending means for cooperating with said pinion rotating means.

3. The actuating mechanism of claim 2 wherein said radially extending means carries a series of pockets, and said pinion rotating means comprises fluid jets for directing fluid to some of said pockets as the pinion passes said jets.

4. The actuating mechanism of claim 1 wherein said pinion rotating means comprises a pinion head, with gear teeth arranged on the perimeter of said head, and complementary gear segments mounted for selective engagement with said pinion gear teeth on diametrically opposite sides thereof.

5. The actuating mechanism of claim 1 wherein said pinion has a radially extending head, and brake means, arranged on diametrically opposite sides thereof, selectively engage a perimeter of said head.

6. The actuating mechanism of claim 1 wherein said pinion is provided with a disc-shaped head coaxial with the axis of rotation of the pinion, and electromagnetic means are provided for creating drag selectively on one side or the other, diametrically, of said head, as said head passes said electrical brake means.

7. The actuating mechanism of claim 1 wherein said actuating means is a counter-balance means.

8. The actuating mechanism of claim 1 wherein said means for preventing rotation of said pinion means by said power train comprise a pinion worm mounted on and rotated by said pinion, a pinion worm gear having teeth engaging said pinion worm, an actuator worm connected to be rotated by said pinion worm gear, and an actuator worm gear connected to be rotated by said actuator worm.

* * * * *